United States Patent [19]
Fillon

[11] Patent Number: 5,563,846
[45] Date of Patent: Oct. 8, 1996

[54] METHOD AND APPARATUS FOR WELL LOGGING TO OBTAIN HIGH-RESOLUTION SEISMIC IMAGES OF GEOLOGICAL FORMATIONS SURROUNDING HORIZONTAL WELL BORES

[75] Inventor: Richard H. Fillon, New Orleans, La.

[73] Assignee: Texaco Inc., White Plains, N.Y.

[21] Appl. No.: 330,179

[22] Filed: Sep. 23, 1994

[51] Int. Cl.⁶ .............................. G01V 1/40; E21B 47/00
[52] U.S. Cl. ................................ 367/25; 367/21; 367/911; 181/104
[58] Field of Search .................................. 367/15, 21, 25, 367/912, 911; 181/102, 104, 107; 175/50

[56] References Cited

U.S. PATENT DOCUMENTS

| | | | |
|---|---|---|---|
| 3,542,150 | 11/1970 | Youmans et al. | 181/104 |
| 3,697,937 | 10/1972 | Ingram | 367/25 |
| 4,524,324 | 6/1985 | Dickinson | 324/323 |
| 4,833,658 | 5/1989 | Staron | 367/25 |
| 5,016,727 | 5/1991 | Wittrisch | 367/911 |
| 5,164,548 | 11/1992 | Angehrn | 367/25 |
| 5,357,481 | 10/1994 | Lester et al. | 367/912 |

Primary Examiner—Nelson Moskowitz
Attorney, Agent, or Firm—James L. Bailey; Kenneth R. Priem; Russell J. Egan

[57] ABSTRACT

A meso-scale profiling tool has separate upward and downward focused seismic sources, separate upward looking and downward looking directional receivers and a section of the tool containing the sources and receivers adapted to rotate with respect to the remainder of the tool so that the sources and receivers are always in a proper substantially vertical orientation.

11 Claims, 2 Drawing Sheets

METHOD AND APPARATUS FOR WELL LOGGING TO OBTAIN HIGH-RESOLUTION SEISMIC IMAGES OF GEOLOGICAL FORMATIONS SURROUNDING HORIZONTAL WELL BORES

BACKGROUND OF THE INVENTION

1. The Field of the Invention

The present invention relates to horizontal wells and, in particular, to a method and high-resolution meso-scale profiling tool for obtaining seismic images of the geological formations surrounding such a horizontal borehole and especially bed parallel horizontal wells.

2. The Prior Art

Compared to conventional wells which enter the top of a reservoir formation, traverse downward at a steep angle to reservoir beds, and exit the base after a relatively short transit, horizontal drilling technology has produced wells which enter the reservoir, turn nearly parallel to reservoir beds, make a lengthy lateral penetration of the beds and may exit back through the top of the reservoir.

Horizontal wells are able to achieve ten times or more perforation area in the same formation as conventional wells thereby making them potentially very productive. Because of their long lateral transit, however, planning where to direct the horizontal well requires a much greater understanding of lateral variability within the reservoir than is required for planning a conventional well.

A device able to improve delineation of lateral reservoir variability within a field would thus facilitate more efficient hydrocarbon recovery.

SUMMARY OF THE INVENTION

The present invention is a new logging device which will provide seismic resolution of meso-scale reservoir features. meso-scale reservoir features are defined as those which are below the resolution of available 3-D seismic but which are too large to be delineated by available well logging and coring technology. The subject seismic device is designed to be operated within a horizontal well using an intermediate range of frequencies (<>3.5 kHz) and will obtain a very detailed image (ca. 1 ft vertical and horizontal resolution) of an entire formation (potentially to a distance of over a hundred feet above and below the well bore).

DESCRIPTION OF THE DRAWINGS

The present invention will now be described, by way of example, with reference to the accompanying drawings in which.

DETAILED DESCRIPTION OF THE PRESENT INVENTION

Figure 1:
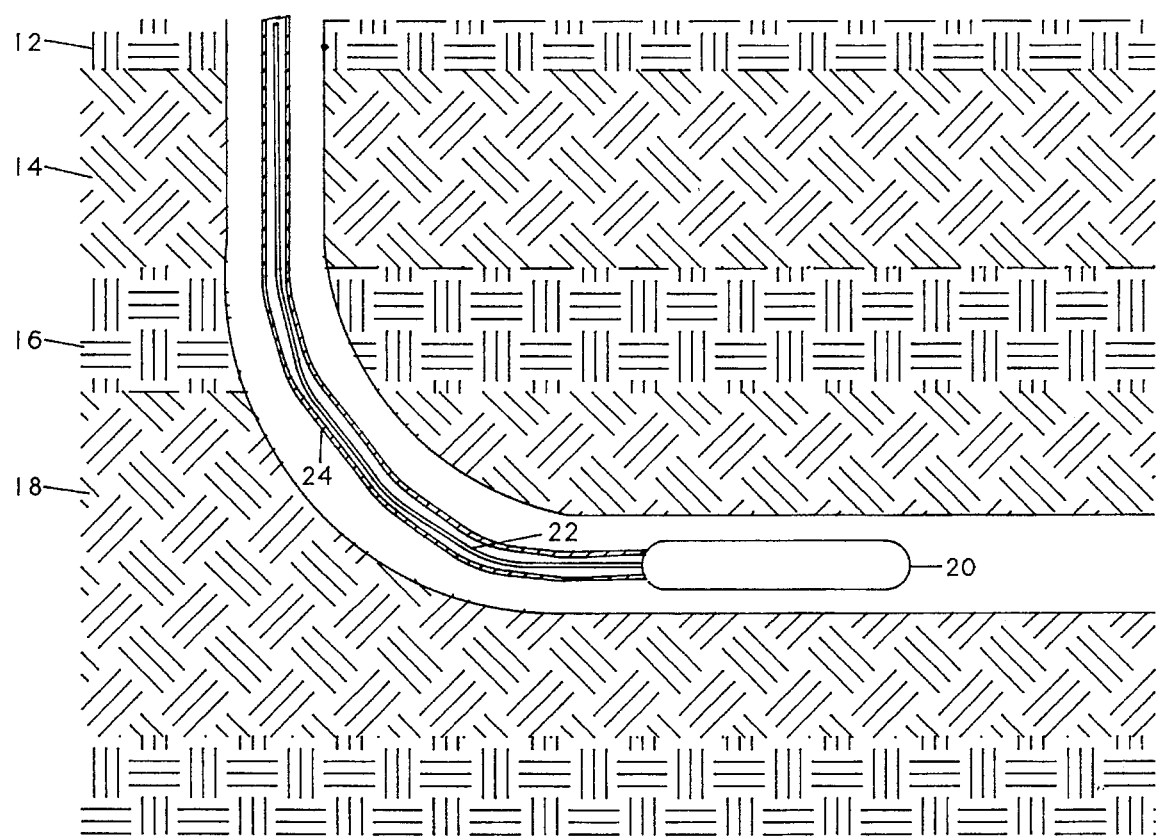
FIG. 1 is a schematic vertical section through a section of earth penetrated by a horizontal well.
Figure 2:
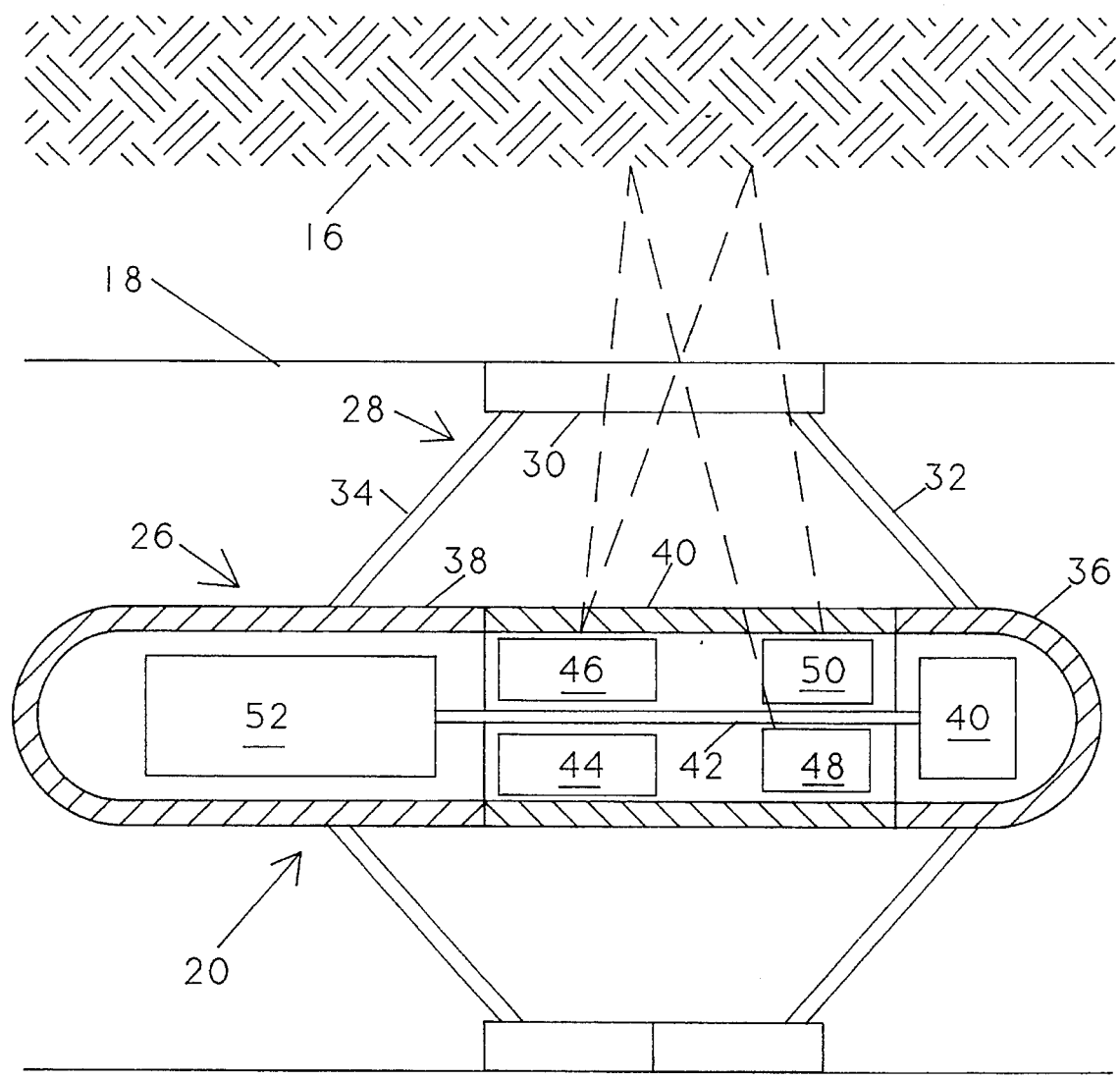
FIG. 2 is a schematic vertical section through the meso-scale profiling tool of the present invention.

A typical horizontal well 10 is shown in FIG. 1 penetrating a plurality of strata 12, 14, 16 before boring horizontally into the desired strata 18. The profiling tool 20 is in communication with the surface by means of cable 22 which may be routed within or ported through a drill pipe 24 to which the profiling tool is attached for purposes of conveyance into the horizontal wellbore. The tool 20 is shown in somewhat greater detail in FIG. 2 and has an elongated housing 26 provided with a plurality (usually three) of stabilizing means 28 each formed by a borehole wall engaging pad 30 and resilient legs 32, 34, the ends of which are respectively attached to the front portion 36 and rear portion 38 of housing 26. The front portion 36 has a servo motor 40 with a pendulum switch (not shown) connected to drive an axle 42 which extends between front and the rear portions 36, 38 and carries an intermediate portion 40 which is rotatable with respect to the rest of the housing 26. Inside of the intermediate portion 40 there is a downward-focused source 44, an upward-focused source 46, a down looking receiver 48 and an up-looking receiver 50. A preprocessing and amplification module 52 is mounted in the rear portion 38 of the housing 26.

The preferred source and receiver for the subject tool are analogous to those used in marine sub-bottom profilers. Sub-bottom profilers are ship's hull or towed ("fish" mounted) seismic devices operating in the <>3.0 kHz frequency range and which are currently employed in the study of meso-scale features in sediments to depths a few hundred feet below the sea bed. The energy source in sub-bottom profilers is an electrical transducer or an electromagnetically driven plate ("boomer"), for example that shown in U.S. Pat. No. 5,042,611, the disclosure of which is incorporated herein by reference. There currently are both analog and digitally recording sub-bottom profilers on the market, the latter offering potentially superior data processing. Some of these devices are very compact and intended for use at all oceanic depths and pressures (to >30,000 ft).

The method for placing the meso-resolution profiling tool of the present invention into a horizontal wellbore would be the same as that used for any currently available horizontal wellbore tools. Existing down-hole seismic tools fall into several categories:

1) those which match surface seismic resolution, e.g., vertical seismic profiling and cross-well tomography systems, using low frequencies (<<3.5 kHz), and are intended to resolve large scale features;

2) those similar to an acoustic cement bonding log which use high frequencies (>3.5 kHz) and examine a very small range of travel times seeking reflections which delineate small features immediately behind casing;

3) those similar to a sonic log, which also use high frequencies and seek information on seismic velocities in the sediments immediately surrounding the well bore; and 4) those similar to sonic-imaging logs which use high frequencies and record variations in reflection strength in the inside of the borehole.

Developing a meso-scale resolving profiling tool requires combining down-hole seismic technologies of existing down-hole tools with the frequency ranges and recording modes of the marine sub-bottom profilers.

A key technological problem which must be addressed in a sub-surface strata-profiler of the present type is separating and distinguishing signals returning from above and below the horizontal wellbore. The present invention includes several mechanical and processing features to minimize such crossover effects, such as:

1) separate upward and downward focused transducer or boomer sources fired alternately;

2) separate up-looking and down-looking directional receivers to minimize energy returns from the wrong direction;

3) the two receivers, one up-looking mounted on the top (up facing side) of the tool, the other down-looking mounted on the bottom (down facing side) of the tool receive signals returning from above or below, respectively, with a resolvable time delay corresponding to the width of the logging tool. The delay is used in a pre-processor 50 or in final processor (not shown) to damp crossover returns.

Fortunately, in a formation where the reservoir beds are relatively flat-lying, very little energy is returned from sediments horizontally to either side of the well bore because source energy dispersed in those directions would exceed the critical angle of incidence and be lost.

Further mechanical features are necessary to insure that the up-looking and down-looking receiver of the subject profiling tool are oriented in vertical plane when the tool is in a horizontal or near horizontal wellbore, for example, in the preferred embodiment:

1) the tool is constructed with the source and receiver array arranged to rotate about the long axis of the tool;

2) rotation is positively driven by a reversible servo-motor;

3) the motor is activated by a transversely mounted pendulum-triggered switch or inclinometer in response to deviations from the vertical plane caused by movement of the tool through the well bore.

By adapting the processing parameters of acoustic cement bonding logs in detecting casing and annulus returns, it should be possible for the present invention to screen near returns thereby enabling the profiling tool to be operated in cased wellbores and/or in wellbores with slotted liners.

For ease of interpretation, the actual seismic record, detailing travel time from and to the well bore, would have to be corrected to a horizontal datum during processing. This would be achieved by using borehole survey sub-surface depth data to vertically rectify the return signal.

The type of seismic record expected from a subsurface strata-profiler according to the present invention would image the top, base and internal geometry of a reservoir in considerable detail. The data could be employed directly in: measuring the angle of dip of beds and variations in dip of beds in the formation over the distance of penetration of the acoustic signal; measuring the thickness of and variations in thickness of beds in the formation over the distance of penetration of the acoustic signal; detecting cross-cutting stratigraphic features, channels, scours, etc., which interrupt the normal trends of beds in the formation; detecting cross-cutting structural features, faults, folds, fracture systems, etc., which interrupt the normal trends of beds in the formation; and measuring signal strength and variations in reflectivity of beds in the formation caused by variations in lithology, fluid content, mineralization, etc.

Obtaining measurements from the sub-surface strata-profiler would facilitate: construction of reservoir models including sand and shale bed distributions, and geometry and fluid levels from which to calculate net sand, net pay, and production parameters; and the selection of specific completion zones and tight or wet non-completion zones in the well. This selectivity would encourage the development of variable completion technology.

The several existing methods of resolving sand versus shale bed thickness and hydrocarbon versus water zones for model creation or for selective well completion, include gamma ray, rate of penetration, and resistivity logging, and side wall core recovery. All of these methods perform better in conventional wells than in horizontal well bores because of effects related to the low angle made by reservoir bedding with the sides of a horizontal borehole.

In horizontal wells, logged gamma radiation from shales will pass through intervening sands. Logged resistivities at various depths of investigation will also reflect averages of sand and shale where beds are thin. These logging techniques applied in horizontal wells therefore do not yield as clear a record of beds and bed fluids as in conventional wells.

Measurements obtained from a sub-surface strata-profiler according to the present invention would: improve conventional log data by providing a basis for employing a bed angle function to computationally correct gamma, and resistivity data. Seismic information gathered by the sub-surface strata-profiler additionally would: provide a means of more precisely calibrating 3-D seismic to lateral variations in lithology within the reservoir.

The present invention may be subject to many modifications and changes without departing from the spirit or essential characteristics thereof. The present embodiment should therefor be considered in all respects as illustrative and not restrictive of the scope of the present invention as defined by the appended claims.

I claim:

1. A high resolution meso-scale seismic profiling tool for use in horizontal borehole section, comprising:

a housing containing;

separate upward and downward directionally focused seismic sources mounted in said housing and arranged to be fired alternately;

separate upward and downward focused directional seismic receivers to minimize seismic energy reflection returns from the unfocused direction;

means for rotatably mounting said sources and receivers in said housing to keep said sources and said receivers respectively mounted in a substantially vertical plane;

whereby said two receivers, one upward focused and mounted on the up facing side of the tool, the other downward focused and mounted on the down facing side of the tool each receive signals returning from above or below, respectively, with a resolvable time delay corresponding to the width of the logging tool.

2. The profiling tool according to claim 1 further comprising:

motor driven means for mounting said source and receiver array in said housing so as to enable rotation about the longitudinal axis of the tool.

3. The profiling tool according to claim 2 wherein said motor driven means further comprises:

a reversible servo-motor adapted to drive said sources and receivers in rotation.

4. The profiling tool according to claim 3 and further comprising:

inclination sensing means connected to actuate said servo motor in response to deviations from the vertical plane caused by movement of the tool through the well bore.

5. The profiling tool according to claim 4 wherein said inclination sensing means is a transversely mounted pendulum triggered switch.

6. The profiling tool according to claim 4 wherein said inclination sensing means is an inclinometer.

7. A method for obtaining high resolution meso-scale profiling in horizontal well bores comprising the steps of:

providing a downhole seismic tool having separate upwardly and downwardly focused seismic sources, separate upwardly and downwardly focused directional seismic receivers, and means for keeping said sources and receivers in substantially vertical alignment;

alternately energizing said sources; and comparing reflected seismic signal returns received by said receivers and determining a delay time which is used to damp out crossover returns.

8. The method according to claim 7 wherein said reflection seismic measurements are used for measuring the angle of dip of beds and variations in dip of beds in the formation over the distance of penetration of the acoustic signal.

9. The method according to claim 7 wherein said reflection seismic measurements are used for measuring the thickness of and variations in thickness of beds in the formation over the distance of penetration of the acoustic signal.

10. The method according to claim 7 wherein said measurements are used for detecting cross-cutting structural features, faults, folds, and fracture systems, which interrupt the normal trends of beds in the formation.

11. The method according to claim 7 wherein said measurements are used for measuring signal strength and variations in reflectivity of beds in the formation caused by variations in lithology, fluid content, or mineralization.

* * * * *